United States Patent
Morris

(10) Patent No.: US 6,405,642 B1
(45) Date of Patent: Jun. 18, 2002

(54) FOOD GRILLING DEVICE FOR A SKILLET

(76) Inventor: Vergie M. Morris, 4811 N 84th Dr., Phoenix, AZ (US) 85037

(*) Notice: Subject to any disclaimer, the term of this patent is extended or adjusted under 35 U.S.C. 154(b) by 0 days.

(21) Appl. No.: 09/759,073

(22) Filed: Jan. 12, 2001

(51) Int. Cl.[7] .................................................. A47J 37/10
(52) U.S. Cl. ............................ 99/425; 99/415; 99/418; 99/445; 99/450
(58) Field of Search ........................ 99/425, 422, 415, 99/418, 445, 446, 444, 400, 401, 450

(56) References Cited

U.S. PATENT DOCUMENTS

| | | | |
|---|---|---|---|
| 1,356,432 A | * | 10/1920 | Eidt .............................. 99/418 |
| 1,899,682 A | * | 2/1933 | Goldenberg ................. 99/445 |
| D177,360 S | | 4/1956 | Becker et al. |
| 3,453,949 A | | 7/1969 | Levin |
| 3,994,212 A | | 11/1976 | Wong |
| 4,121,510 A | | 10/1978 | Frederick |
| D257,115 S | | 9/1980 | Anderson |
| D297,393 S | | 8/1988 | Picozza et al. |
| 4,979,440 A | * | 12/1990 | Latour et al. ................. 99/445 |
| 5,323,693 A | * | 6/1994 | Collard et al. ................ 99/425 |
| 5,467,691 A | * | 11/1995 | Koziol ..................... 99/445 X |
| 6,182,557 B1 | * | 2/2001 | Wilk ........................ 99/422 X |

* cited by examiner

Primary Examiner—Reginald L. Alexander

(57) ABSTRACT

A food grilling device for a skillet for separating the juices from the sausages and hotdogs while being cooked. The food grilling device for a skillet includes a food support assembly being adapted to removably rest upon a bottom wall of a skillet and including a disc-shaped support member having a wall with a plurality of holes disposed therethrough, and also including leg members being securely attached upon a bottom side of the wall.

4 Claims, 2 Drawing Sheets

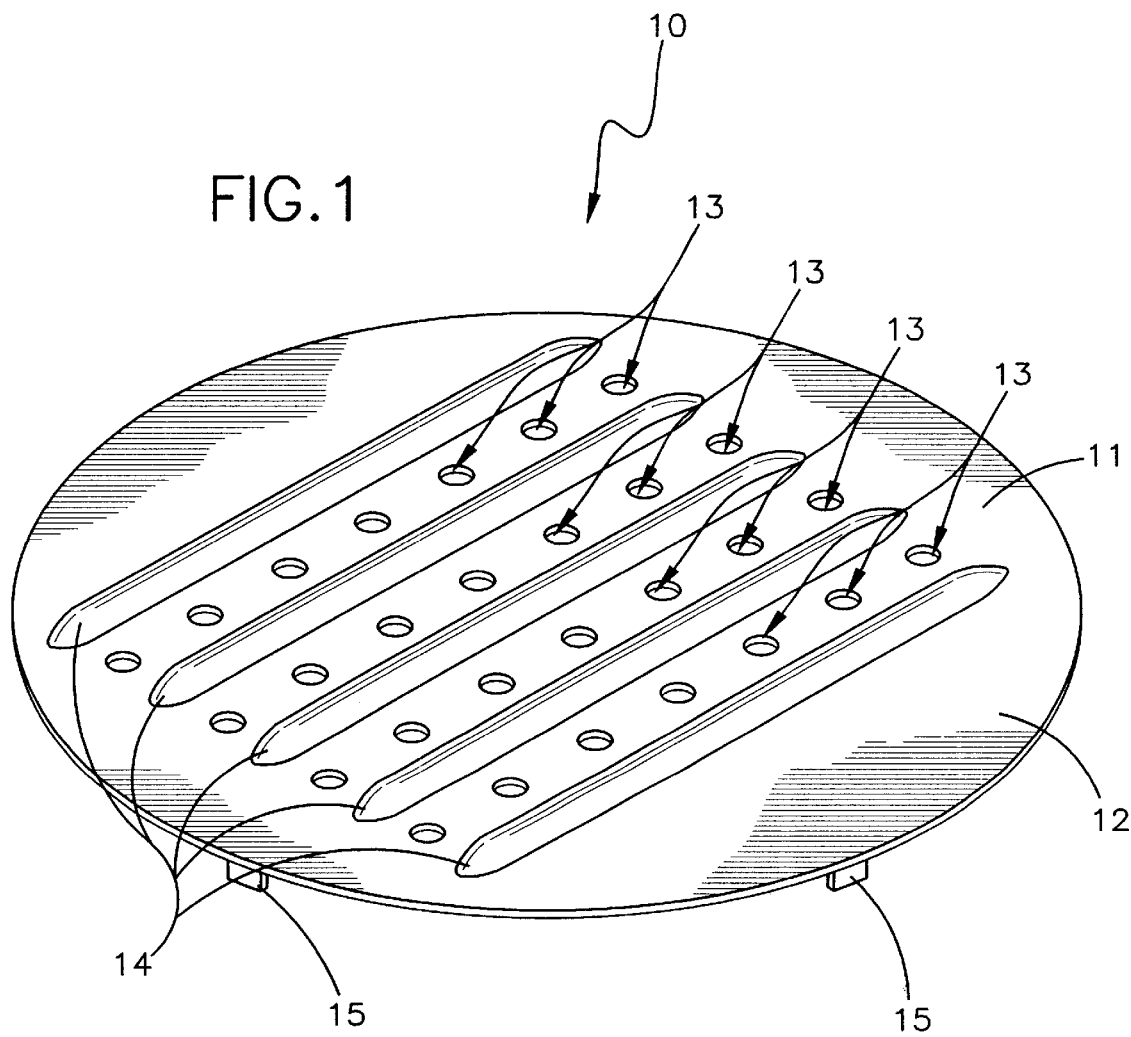

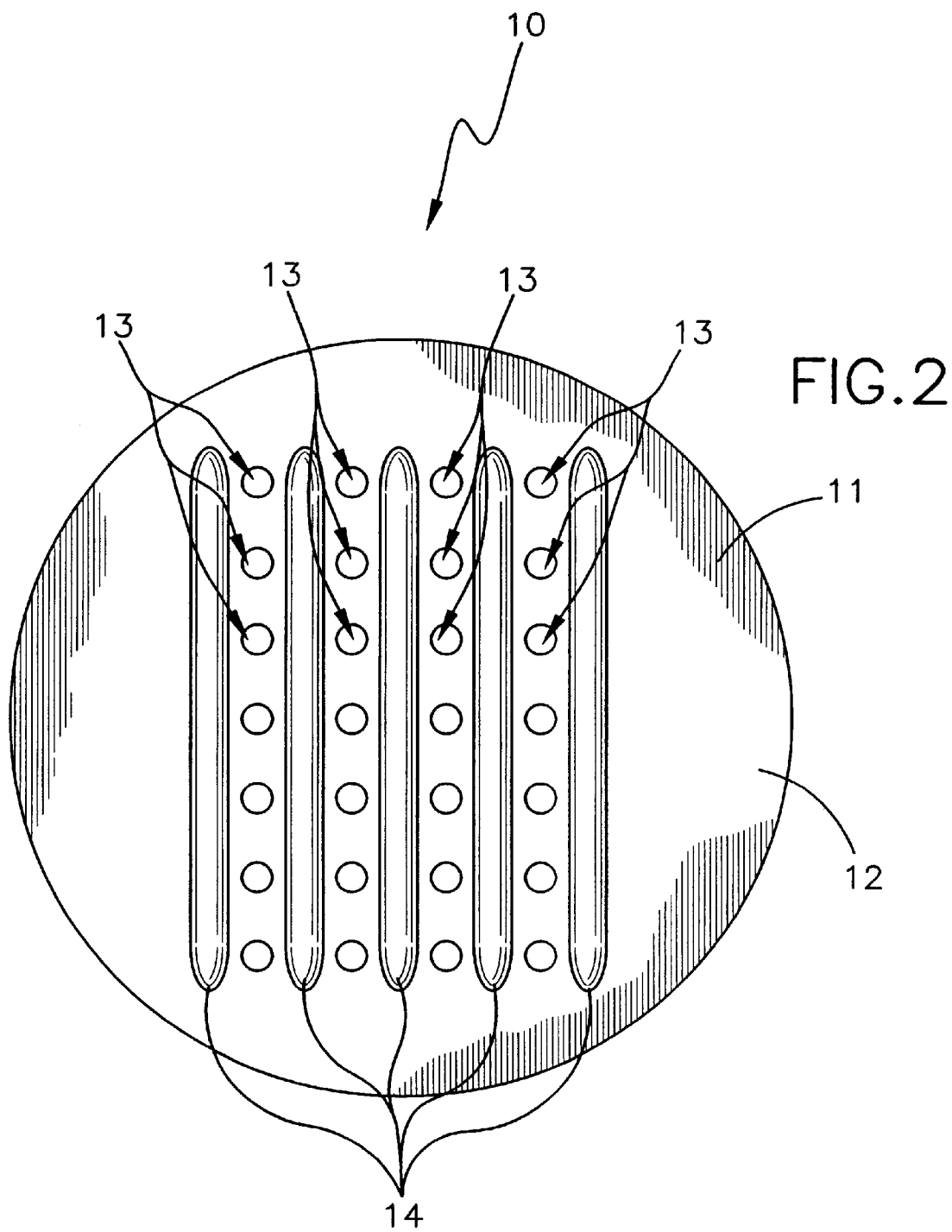

FOOD GRILLING DEVICE FOR A SKILLET

BACKGROUND OF THE INVENTION

1. Field of the Invention

The present invention relates to a food grilling tool and more particularly pertains to a new food grilling device for a skillet for separating the juices from the sausages and hotdogs while being cooked.

2. Description of the Prior Art

The use of a food grilling tool is known in the prior art. More specifically, a food grilling tool heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,121,510; U.S. Pat. No. 3,453,949; U.S. Pat. No. Des. 177,360; U.S. Pat. No. Des. 257,115; U.S. Pat. No. 3,994,212; and U.S. Pat. No. Des. 297,393.

While these devices fulfill their respective, particular objectives and requirements, the aforementioned patents do not disclose a new food grilling device for a skillet. The inventive device includes a food support assembly being adapted to removably rest upon a bottom wall of a skillet and including a disc-shaped support member having a wall with a plurality of holes disposed therethrough, and also including leg members being securely attached upon a bottom side of the wall.

In these respects, the food grilling device for a skillet according to the present invention substantially departs from the conventional concepts and designs of the prior art, and in so doing provides an apparatus primarily developed for the purpose of separating the juices from the sausages and hotdogs while being cooked.

SUMMARY OF THE INVENTION

In view of the foregoing disadvantages inherent in the known types of food grilling tool now present in the prior art, the present invention provides a new food grilling device for a skillet construction wherein the same can be utilized for separating the juices from the sausages and hotdogs while being cooked.

The general purpose of the present invention, which will be described subsequently in greater detail, is to provide a new food grilling device for a skillet which has many of the advantages of the food grilling tool mentioned heretofore and many novel features that result in a new food grilling device for a skillet which is not anticipated, rendered obvious, suggested, or even implied by any of the prior art food grilling tool, either alone or in any combination thereof.

To attain this, the present invention generally comprises a food support assembly being adapted to removably rest upon a bottom wall of a skillet and including a disc-shaped support member having a wall with a plurality of holes disposed therethrough, and also including leg members being securely attached upon a bottom side of the wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new food grilling device for a skillet which has many of the advantages of the food grilling tool mentioned heretofore and many novel features that result in a new food grilling device for a skillet which is not anticipated, rendered obvious, suggested, or even implied by any of the prior art food grilling tool, either alone or in any combination thereof.

It is another object of the present invention to provide a new food grilling device for a skillet which may be easily and efficiently manufactured and marketed.

It is a further object of the present invention to provide a new food grilling device for a skillet which is of a durable and reliable construction.

An even further object of the present invention is to provide a new food grilling device for a skillet which is susceptible of a low cost of manufacture with regard to both materials and labor, and which accordingly is then susceptible of low prices of sale to the consuming public, thereby making such food grilling device for a skillet economically available to the buying public.

Still yet another object of the present invention is to provide a new food grilling device for a skillet which provides in the apparatuses and methods of the prior art some of the advantages thereof, while simultaneously overcoming some of the disadvantages normally associated therewith.

Still another object of the present invention is to provide a new food grilling device for a skillet for separating the juices from the sausages and hotdogs while being cooked.

Yet another object of the present invention is to provide a new food grilling device for a skillet which includes a food support assembly being adapted to removably rest upon a bottom wall of a skillet and including a disc-shaped support member having a wall with a plurality of holes disposed therethrough, and also including leg members being securely attached upon a bottom side of the wall.

Still yet another object of the present invention is to provide a new food grilling device for a skillet that is easy and convenient to place upon a skillet.

Even still another object of the present invention is to provide a new food grilling device for a skillet that provides a much more healthier way of cooking foods inherently known for their fat content.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new food grilling device for a skillet according to the present invention.

FIG. 2 is a top plan view of the present invention.

DESCRIPTION OF THE PREFERRED EMBODIMENT

With reference now to the drawings, and in particular to FIGS. 1 through 2 thereof, a new food grilling device for a skillet embodying the principles and concepts of the present invention and generally designated by the reference numeral 10 will be described.

As best illustrated in FIGS. 1 through 2, the food grilling device for a skillet 10 generally comprises a food support assembly being adapted to removably rest upon a bottom wall of a skillet and including a disc-shaped support member 11 having a wall 12 with a plurality of holes 13 being disposed therethrough, and also including leg members 15 being securely and conventionally attached upon a bottom side of the wall 12. The food support assembly further includes a plurality of elongate rib members 14 being spaced apart and being conventionally disposed parallel upon a top side of the wall 12. The holes 13 are arranged in rows and are spaced apart and disposed between the elongate rib members 14 for allowing juices from food to drain off the disc-shaped support member 11 and into the skillet. The leg members 15 are generally tab-like members being securely and conventionally attached near a perimeter of the disc-shaped support member 11 and extend generally perpendicular to the disc-shaped support member 11. The support member 11 is adapted to be spaced above the bottom wall of the skillet.

In use, the user places the disc-shaped support member 11 upon a skillet and places sausages and hotdogs upon the elongate rib members 14 with the juices from the sausages and the hotdogs being able to drain through the holes 13 and onto the skillet.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food grilling device for a skillet comprising:

a food support assembly being adapted to removably rest upon a bottom wall of a skillet, said food support assembly including:
a disc-shaped support member having a wall with a plurality of holes disposed therethrough, said support member having a substantially planar top side and a bottom side;
leg members being securely attached upon and extending away from the bottom side of said wall;
a plurality of elongate rib members protruding from the top side of said support member, said rib members being oriented substantially parallel to each other; and
wherein said plurality of holes is arranged in rows, each of said rows being disposed between said elongate rib members for allowing juices from food to drain off the top side of said disc-shaped support member and into the skillet;
wherein each of said plurality of holes has a uniform diameter extending through the wall of said support member, a separation between each of said holes and an adjacent one of said rib members being less than said diameter for facilitating drainage of the juices from the top side of said support member.

2. A food grilling device for a skillet as described in claim 1, wherein said leg members comprise tab members being positioned near a perimeter of said disc-shaped support member and extend generally perpendicular to said disc-shaped support member, said support member being adapted to be spaced above the bottom wall of the skillet.

3. A food grilling device for a skillet as described in claim 1, wherein said plurality of elongate rib members comprises five rib members, and a said row of holes between adjacent said rib members includes seven holes.

4. A food grilling device for a skillet comprising:

a food support assembly being adapted to removably rest upon a bottom wall of a skillet, said food support assembly including:
a disc-shaped support member having a wall with a plurality of holes disposed therethrough, said support member having a substantially planar top side and a bottom side;
leg members being securely attached upon and extending away from the bottom side of said wall;
a plurality of elongate rib members protruding from the top side of said support member, said rib members being oriented substantially parallel to each other; and wherein said plurality of holes is arranged in rows, each of said rows being disposed between said elongate rib members for allowing juices from food to drain off the top side of said disc-shaped support member and into the skillet;

wherein each of said plurality of holes has a uniform diameter extending through the wall of said support member, a separation between each of said holes and an adjacent one of said rib members being less than said diameter for facilitating drainage of the juices from the top side of said support member;

wherein said leg members comprise tab members being positioned near a perimeter of said disc-shaped support member and extend generally perpendicular to said disc-shaped support member, said support member being adapted to be spaced above the bottom wall of the skillet; and wherein said plurality of elongate rib members comprises five rib members, and a said row of holes between adjacent said rib members includes seven holes.

* * * * *